United States Patent Office.

SAMUEL D. BROOKS, OF BALTIMORE, MARYLAND.

Letters Patent No. 92,258, dated July 6, 1869.

---

IMPROVEMENT IN PROCESS FOR SOLDERING THE JOINTS AND SEAMS OF METALLIC VESSELS.

---

The Schedule referred to in these Letters Patent and making part of the same.

---

*To all whom it may concern:*

Be it known that I, SAMUEL D. BROOKS, of the city and county of Baltimore, in the State of Maryland, have invented a new and useful Process for Soldering and Securing the Joints and Seams of Tin Cans, and other Metallic Vessels; and I do hereby declare the following to be a full and exact description thereof.

The nature of my invention consists—

First, in dipping one or both of the two edges or surfaces, which are to form each joint or seam of a metallic vessel, into a bath of molten solder or soldering-metal, before the joint or seam is formed.

Secondly, after the molten metal has cooled and hardened thereon, in subsequently forming a joint or seam therewith; and Thirdly, closing and securing said joint, by simply heating the edges in contact sufficiently to produce a fusion of the solder enclosed therein.

The object of my invention is to produce a joint as strong and tight as any yet produced, without the labor and expense attending the soldering of cans by any of the ordinary processes heretofore employed, and without the expensive apparatus required in uniting seams by heat and pressure alone, without solder.

To enable others skilled in the art to use and practise my invention, I will proceed to describe the same in detail.

Having cut and formed the metallic sheets into suitable blanks, I first prepare one or both of the edges which are to form a seam or joint in the usual manner, with a flux to receive and retain a soldering-alloy, such as by dipping them into a solution of muriate of zinc, or of sal-ammoniac, or by applying thereto grease, or pulverized rosin, or any equivalents for the same end.

I next dip these prepared edges into a bath of fused metal, (by preference, of some suitable soldering-alloy, such as tin and lead,) and allow the thin coating thus obtained thereon to chill and harden.

It will be observed that the result of this portion of my process is not only to obtain a coating of fusible metal or solder along both sides of each edge so dipped, but that the iron surface exposed in the edge, in cutting out the plates, will be also coated, and that if the dipped edge be lifted horizontally from the bath, the coating of solder will be thickest at and along the very extremity of the edge.

Having thus prepared one or both of the edges which are to form a joint or seam, I coat them slightly with pulverized rosin, or other equivalent flux, (as above named,) by preference first dipping them into grease, and then into the powdered rosin, and then bring and close them together, and holding them in the usual manner, so as to form the desired seam or joint, "sweat" them, or, in other words, apply heat thereto in any convenient way, either by the direct application of a hot iron to the seam, or by placing the seam or joint upon a hot plate, or exposing it to a hot fire.

The heat will produce a fusion of the solder along and in the seams or joint, sufficient to unite the adjacent edges, and fill up all interstices therein.

By this improved process of making and soldering tin cans, and other metallic vessels, their manufacture is reduced to the utmost simplicity.

The edges of the blanks may by dipped in the molten metal, and thus prepared for soldering, by women or girls.

So soon as thus prepared, they may be formed and shaped, and their joints swayed and closed by the ordinary machines commonly used for the purpose, after which it is only necessary to run a hot iron along the side-seams, or to place the joints upon plates, or over a flame, sufficiently hot to fuse the solder, in order to perfect and close the work, which may also be done by women or girls.

Mere contact of the prepared edges is alone required to produce their union, by the application of heat; hence the use of complicated machinery, for obtaining a powerful hot-pressure, is entirely avoided.

A more perfect and far stronger seam is also obtained, than by mere hot-pressure, from the fact, not only that sufficient solder is surely employed, but also because that, with tin plates, the body of iron necessarily exposed along the edge in cutting the plate, is recoated before the joints are formed, insuring a perfect union thereof with the opposite surface in contact therewith, which would not otherwise be the case.

Another advantage, of no small importance in large factories, is found in the great economy of solder obtained by my process, one-half less fusible metal being required therein than where the joints are dipped, or are flowed with solder from soldering-irons, or are otherwise coated by a fusion of solder thereon after being formed.

I do not claim uniting the seams and joints by heat and pressure alone, but, having fully described my invention,

I claim as new, and desire to secure by Letters Patent—

The improved method, herein substantially described, of producing a soldered joint or seam in a metallic vessel, viz, by first dipping, into a bath of molten metal or alloy, one or both of the edges or surfaces which are to form the desired joint or seam, so as to coat them with fusible metal before they are brought together; and, secondly, applying heat, in any suitable manner, to the joint or seam obtained, by properly placing and holding these coated edges in contact, with or without flux, all substantially as herein set forth.

The foregoing specification of my improved process for soldering joints and seams of metallic vessels, signed by me this 24th day of May, 1869, in the presence of—

S. D. BROOKS.

W. BURRIS,
J. M. BURR.